United States Patent Office 3,505,313
Patented Apr. 7, 1970

3,505,313
PROCESS FOR PRODUCING BLEACHED AND
PURIFIED CELLULOSE ACETATE
Ichiro Kato, Matsuyama-shi, Japan, assignor to Teijin
Limited, Osaka, Japan, a corporation of Japan
No Drawing. Filed Apr. 17, 1967, Ser. No. 631,136
Int. Cl. C08b 3/22
U.S. Cl. 260—230                                    12 Claims

ABSTRACT OF THE DISCLOSURE

Process for producing bleached and purified cellulose acetate, which comprises effecting in the course of the production of cellulose acetate, an oxidative treatment followed by a reducing treatment during the state in which the cellulose acetate is in a solution state prior to its precipitation.

---

This invention relates to the production of cellulose acetate having excellent resistance to heat and whose coloration as well as content of impurities is small.

For attaining these ends, the following procedures have been practiced in the past:

(1) Enhancing the bleaching and purification during the pulp stock stage.

(2) Enhancing by physical means the purification during either the step of precipitating the cellulose acetate or the step of washing the precipitate.

(3) Carrying out bleaching or stabilizing treatments in the state in which the solids of cellulose acetate are dispersed in a liquid.

However, these conventional procedures had the following defects, namely:

In the procedure of (1), above:

(a) The yield of pulp falls as a result of the intensification of the purification step.

(b) Even though white pulp is obtained, coloration of the cellulose acetate takes place during the step of obtaining cellulose acetate therefrom as a result of the formation of impurities by the deterioration of the cellulose or substances contained therein.

(c) Limitations are imposed on the text to which bleaching and purification can be carried out on the pulp stock in view of the requirement as to the degree of polymerization that the pulp must have to qualify as material for cellulose acetate, as well as other requirements.

(d) The degree of resistance to heat of cellulose acetate and its content of impurities, rather than being affected by the pulp used, are effected much more by the manufacturing conditions of the cellulose acetate and various other factors during the production process.

In the procedure of (2), above:

(a) The physical purification treatment is carried out either by raising the concentration of acetic acid or by raising the precipitation and washing temperatures. However, in order to obtain treatments effects that are of an extent such as to be desirable the yield of the cellulose acetate must be sacrificed considerably. And especially in the case of the elimination of the impurities which become the cause of the coloration of the product, not much improvement can be expected even though a great sacrifice is made in the yield.

(b) While the readily soluble impurities are diffused and eliminated in this procedure, the difficulty soluble impurities, not being eliminated, remain behind in the cellulose acetate.

In the procedure of (3), above:

(a) Since the treatment of the cellulose acetate is carried out in its solid state, its effects are dependent upon the penetrability of the bleaching agent into the interior of the solids. Hence, fully satisfactory bleaching effects cannot be obtained unless harsh operating conditions are employed, such as the use of the bleaching agent at high concentrations and elevated temperatures.

(b) Since it is usual to carry out the bleaching and stabilizing treatments separately, not only do the operating steps increase, but also a separate exclusive equipment becomes necessary for this purpose aside from the essential equipment required for the cellulose acetate bleaching step.

(c) Since harsh treatment conditions are employed, there are numerous drawbacks, such as the decline in the degree of polymerization of the cellulose acetate and its degeneration, and especially a localized decline in the degree of polymerization and degeneration of the cellulose acetate flakes, as well as corrosion of the equipment.

With a view of eliminating these shortcomings of the conventional methods, I made extensive researches into the matter, with the consequence that I found that the end could be attained very effectively by subjecting the cellulose acetate to an oxidation treatment during the stage that it is in a solution and thereafter subjecting it to be reducing treatment. This invention was perfected on the basis of this discovery.

Namely, this invention is directed to a process for producing purified cellulose acetate which is characterized that in the process of producing cellulose acetate, at the stage wherein the cellulose acetate is in a solution state before it precipitates as flakes, 0.005–5% by weight, based on the cellulose acetate, of an oxidant is added to said solution to carry out the oxidative bleaching treatment, and thereafter 0.001–10% by weight, based on the cellulose acetate, of a reducing agent is added to carry out the reducing treatment.

This invention will be described more fully hereinafter. Aside from the bleaching and purification step, the usual steps which are employed in the ordinary method of producing cellulose acetate are also applicable to the process of this invention. The usual steps of producing cellulose acetate are well known. If summarized the ordinary method of producing cellulose acetate is carried out in the following means.

The pulp, the starting material of the cellulose acetate, is first pretreated either with acetic acid or a liquor which is predominantly acetic acid to render the material into a form which promotes the acetylation reaction. Next, the pretreated pulp is acetylated by a principal reaction liquor consisting of acetic anhydride, acetic acid and a strong acid, or according the so-called methylene chloride method by a principal reaction liquor consisting of acetic anhydride, acetic acid, methylene dichloride and a strong acid to be converted to so-called cellulose triacetate. The strong acid used in the principal reaction liquor performs the function of a catalyst in the acetylation reaction, and sulfuric acid is usually used, but frequently such acids as perchloric or sulfonic acid is used.

For obtaining cellulose triacetate as the final product, the excess acetic anhydride is hydrolyzed after completion of the acetylation reaction and further the strong acid used as catalyst in the acetylation reaction is neutralized by means of an aqueous acetic acid solution containing sodium acetate or ammonium acetate. The so neutralized cellulose triacetate solution is precipitated in an aqueous acetic solution or water to deposit cellulose triacetate flakes.

For obtaining cellulose diacetate as the final product, the excess acetic anhydride is hydrolyzed after completion of the acetylation reaction, after which the hydrolysis of the cellulose triacetate is carried out after further addition of water and, on occasions, of a strong acid as catalyst. The so-called combined acetic acid content of cellulose triacetate is 61–62%, but as a result of the hydrolysis it becomes so-called cellulose diacetate of an acetic acid content of 53–6%. When the cellulose acetate has attained the desired acetic acid value as a result of the hydrolysis, hydrolysis to an excessive degree is restrained by neutralizing the strong acid used as catalyst of the hydrolysis by adding an aqueous acetic acid solution containing sodium acetate or ammonium acetate. The so neutralized cellulose diacetate solution is diluted with either an aqueous acetic acid solution or water, thereby precipitating the celluose diacetate in flake form.

In the methylene chloride method, the methylene dichloride used is usually recovered from the cellulose acetate solution before the precipitation by distillation.

The acetic acid contained in the flakes of the cellulose di- or triacetate obtained by precipitation, as hereinbefore described, is recovered by washing with water and drying, and thus the final product is obtained.

Heretofore, for the purpose of obtaining cellulose acetate of good grade by these usual steps in producing cellulose acetate, it was the practice, as previously noted, to carry out the bleaching and stabilizing treatments during either the precipitation or washing step.

The impurities which become the cause of the coloration of the cellulose acetate product as well as the other impurities, e.g., furfural, are generally believed to be formed as a result of the degeneration during either the acetylation reaction or hydrolysis, of such impurities as, say, pentosan, which are contained in the pulp stock. Again, it is believed that the heat stability of cellulose acetate is also made worse by such as sulfuric acid which has bound with these impurities or the cellulose acetate.

As the indispensable condition for producing bleached and purified cellulose acetate according to the invention process the cellulose acetate must be subjected to an oxidative bleaching treatment by the addition thereto of an oxidant while it is in the solution state before precipitation thereof as flakes, after which the cellulose acetate is submitted to a reducing treatment by the addition of a reducing agent.

The oxidative bleaching treatment is preferably carried out subsequent to the neutralization of the strong acid which has been used as the catalyst. The reason is that there is the possibility that certain of the treating agents might be decomposed by the strong acid catalyst, and further for controlling such troubles as a decline in the degree of polymerization of the cellulose acetate which otherwise would become somewhat great. The most suitabl time of treatment is that period immediately before the onset of the precipitation.

Although any of the usual oxidants may be used as the oxidative treating agent, those most preferred for the reasons that the degree of polymerization of the cellulose acetate is not decreased excessively, residues do not remain behind in the cellulose acetate and absence of corrosive action to the equipment, are the alkali metal permanganates, alkali metal chromates, hydrogen peroxide, or the organic peroxides such, for example, as peracetic acid and dicumyl peroxide. However, the chlorites are also excellent oxidative treating agents depending upon the equipment used.

The addition of these oxidative treating agents must be in an amount of 0.005–5% by weight based on the resulting cellulose acetate. The amount which demonstrates desirable bleaching effects using the most purified pulp stock presently being produced commercially is at least 0.005% by weight based on the resulting cellulose acetate. With amounts less than this, little, if any, effects are noted. On the other hand, the effect of elimination of the coloration of the cellulose acetate is enhanced if the amount added of the treating agent is increased, but this brings about a decline in the degree of polymerization of the cellulose acetate or its degeneration and hence is not desirable. Thus, the upper limit of the amount added of the treating agent must be set at 5% by weight. Under commercial conditions, it is recommended that the treatment be carried out with the addition of the oxidative treatment agent in an amount of 0.005–1% by weight for obtaining pronounced effects in the improvement of the grade of the cellulose acetate as well as from the cost standpoint.

While the temperature at which the oxidative treatment is carried out in the invention process will vary depending upon the amount added of the treating agent, in general, relatively low temperatures can be employed and satisfactory results can be obtained with such temperatures. If considerations are given to the avoidance of the degeneration of the cellulose acetate, a temperature of not more than 70° C. is preferred in the case where the treating agent has been added in the hereinbefore indicated preferred range. However, if the temperature is too low, the viscosity of cellulose acetate solution becomes excessively great and the operation becomes difficult. Hence, generally a temperature ranging between 20° C. and 70° C. is preferred.

The treatment time may be shortened as the temperature becomes higher. On a commercial scale a period of from 10 to 120 minutes will do for attaining a homogeneous mixture of the treating agent in the solution, but there is no particular restrictions. According to the invention process, the oxidative reaction takes place very promptly, the end being accomplished by the time the mixture has achieved homogeneity.

As hereinbefore described that the oxidative treatment is carried out when the cellulose acetate is in a solution state is the first novel feature of the invention process. This is very distinctive when compared with the hereinbefore practiced bleaching and purification treatment which carried out this treatment or only the solid materials such as the pulp stock or cellulose acetate flakes. The highly desirable results that are obtained according to the invention process is believed to be based on the fact that the treating agent acts not locally but uniformly on the whole of the cellulose acetate and entrained impurities, since the cellulose acetate is dispersed molecularly in the solution. When the cellulose acetate flakes, which are in solid form, are given the oxidative treatment, the action of the treating agent on the external surface of the flakes and their interior is not uniform. In consequence, a decline in the degree of polymerization or degeneration in the flakes is brought about locally and, in addition, for obtaining an oxidative treatment effect that is satisfactory over the whole of the flakes, it becomes necessary to increase the amount of the treating agent used or employ elevated temperatures. In contradistinction to this, according to the invention process no such local decline in the degree of polymerization and degeneration takes place. In addition, since the treatment results that are obtained for a given amount of the treating agent used and a given treatment temperature are exceedingly great, it becomes possible to employ mild operating conditions.

A primary result that is obtained by the oxidative treatment of this invention is its bleaching of the cellulose acetate. Another result is that the reducing impurities, e.g., furfural, which form from the impurities which become contained in the pulp during its acetylation and hydrolysis steps, are decomposed and removed. In the past, these reducing impurities remained behind entrained in the waste liquor from which the cellulose acetate flakes have been separated, and they could not possibly be removed by such means as distillation. Hence, these reducing impurities gradually accumulated in the acetic acid which was recovered from said waste liquor to be recycled for reuse. Consequently, adverse effects were had on the acetylation reaction and the coloration of the resulting cellulose acetate was aggravated. In contrast, according to the invention process these obnoxious impurities are removed almost completely from the solution prior to the stage in which the cellulose acetate flakes are isolated therefrom.

The maximum effect is obtained in the invention process by the oxidative treating agent of a given amount if the treatment is carried out at the time when the concentration of the cellulose acetate is at its maximum throughout the whole process. In other words, the treating agent in a minimum amount will do for obtaining the same results. Hence, if this treatment is conducted after the methylene dichloride has been distilled off from the solution in the so-called methylene chloride method, the effects are great as well as economical.

That, after having performed the hereinbefore described oxidative treatment, a reducing treatment is carried out by adding a reducing agent to the cellulose acetate solution is the second novel feature of the invention process.

The reducing treatment not only deals with those instances in which an excess of the oxidative treating agent has been used and hence an excess of the oxidant remains behind in the solution, but also converts those impurities much, for example, as iron content which are not removed by the oxidation treatment, to water-soluble matter, thus demonstrating the action of removing impurities which is characteristic of reducing agents.

Further, when the cellulose acetate solution is treated with a reducing agent which forms bubbles after completion of the reducing action, say, oxalic acid, porous cellulose acetate flakes are provided. As a result, the subsequent washing of the flakes is greatly simplified, with the consequence that flakes are obtained whose content of low polymers and impurities is small. Hence, the heat stability of the cellulose acetate is enhanced.

This reducing treatment does not cause any substantial decomposition of the cellulose acetate itself and hence it also is possible to carry out this treatment after having obtained the cellulose acetate in flake form but, as in the case with the oxidation treatment, it is most desirable to carry out this treatment during the period when the cellulose acetate is in a solution state. For obtaining the best results, the reducing treatment should be carried out as soon as possible after completion of the oxidation treatment. As the reducing agent, those which are difficultly decomposed by acids or water are used, and the most desirable agents include, for example oxalic, formic, phosphorous and sulfurous acids or the alkali metal salts thereof.

The amount added of the reducing agent will, of course vary in accordance with the amount used of the oxidant. If an excess of the oxidant remains, the amount of the reducing agent must be such that it is more than sufficient to decompose the excess oxidant remaining behind in the solution. A range of 0.001–10% by weight based on the cellulose acetate is used. However, even though the amount added of the reducing agent is greatly in excess, generally no adverse effects are had on the properties of the cellulose acetate. In the case of phosphorous acid however, an addition thereof in an amount exceeding 10% by weight, based on the cellulose acetate, results in aggravating the decline of the degree of polymerization and hence must be avoided. Commercially, an addition of the reducing agent in an amount of 0.01–3% by weight based on the cellulose acetate is recommended.

There is no particular restriction as to the temperature and time of the reducing treatment but, as in the case with the oxidation treatment, usually it is preferred to use a temperature of 20–70° C. for 10–120 minutes.

Thus, as hereinbefore described, the removal of the coloration of the cellulose acetate, an improvement of its heat stability and reduction in its impurities are very effectively achieved by first carrying out the oxidation treatment when the cellulose acetate is in a solution form and then followed by carrying out the reducing treatment.

The following nonlimitative examples are given for illustrating the invention further. Unless otherwise noted, the parts and percentages are on a weight basis.

EXAMPLE 1

XG pulp was acetylated by the customary methylene chloride method, after which hydrolysis was carried out. When the acetic acid content of the cellulose acetate became 54.8, neutralization of the sulfuric acid used as catalyst was carried out by the addition of an aqueous acetic acid solution of sodium acetate.

To 1000 parts of a cellulose acetate solution consisting of 200 parts of the cellulose diacetate obtained as hereinabove described, 30 parts of water, 750 parts of acetic acid and the remainder of sodium sulfate, sodium acetate and methylene dichloride was added as the oxidant an aqueous potassium permanganate solution in an amount indicated in Table I, after which stirring and mixing of the reaction solution was carried out for 20 minutes at 60° C. This was followed by the addition as the reducing agent of either phosphorous or oxalic acid in an amount indicated in Table I followed by stirring and mixing of the solution for 20 minutes at 60° C. Water was added to the so obtained solution to precipitate the cellulose diacetate in flake form. This was washed with water and dried to yield the final product. The hereinabove described described procedures were those of Runs 1 and 2 which were carried out according to the invention process.

Separately, Run 3, a blank test, was carried out in similar manner but without giving either the oxidation or reducing treatment. Further, as comparison the experiment in which only the oxidation treatment was given is that shown as Run 4. If, in this case, the amount used of the oxidant is further increased, residues of the oxidant will remain behind in the product to impart a coloration thereto. On the other hand, Run 5 is that in which only the reducing treatment was given.

TABLE I

| | Conditions of Experiment | | | Quality of flakes | | | | |
|---|---|---|---|---|---|---|---|---|
| Run | Amount added of aqueous 5% KMnO$_4$ part | Class of reducing agent | Amount added of aqueous 5% reducing agent part | APHA color degree | Ash content, percent | Iron content, p.p.m. | Organic chlorine, p.p.m. | Heat resistance |
| 1 | 8 | H$_3$PO$_3$ | 8 | 20 | 0.041 | 5.2 | 130 | 6.3 |
| 2 | 8 | (COOH)$_2$·2H$_2$O | 6 | 25 | 0.047 | 4.6 | 135 | 6.5 |
| 3 | 0 | | 0 | 95 | 0.059 | 8.3 | 235 | 7.3 |
| 4 | 4 | | 0 | 50 | 0.060 | 8.5 | 153 | 7.5 |
| 5 | 0 | H$_3$PO$_3$ | 8 | 90 | 0.050 | 6.1 | 220 | 6.8 |

NOTE.—APHA color degree is a value obtained by dissolving 6 grams of the flakes in 100 cc. of a mixed solvent consisting of 90% by weight of methylene dichloride and 10% by weight of methanol and making color comparison with the standard Hazen solution at the same liquid height. The smaller this value is, the smaller will be the coloration. Heat resistance is a value determined by the degree of coloration obtained after stuffing the powdered flakes in a test tube and heating this for 10 minutes at 230° C.

It is apparent that results obtained in Runs 1 and 2, which were carried out according to the invention process, far surpass that of the other runs which were performed by way of comparison.

Further, with respect to Runs 1 and 3, acetic acid was recovered from their respective waste liquors, the liquor remaining after isolation of the cellulose diacetate. Determination of the concentration of furfural in the so recovered acetic acid was made. Also a quantitative analysis of the reducing impurities contained therein was made using a solution. The results are shown in Table II.

TABLE II

| Run No. | Concentration of furfural in recovered acetic acid, percent | Required cc. of 0.01 N$KMnO_4$/10 cc. of recovered acetic acid |
|---|---|---|
| 1 | 0.008 | 1.5 |
| 3 | 0.027 | 6.3 |

On the other hand, when potassium permanganate and oxalic acid which correspond to those of Run 2 are chosen as the treating agents in the bleaching treatment of the solid flakes, it becomes necessary after the treatment to wash the flakes thoroughly with soft water which does not contain calcium ions, such as ion exchange water. If this washing is not carried out, an exceedingly turbid solution is obtained when the so obtained flakes are dissolved in, say, acetone. Hence, flakes such as these are not suitable for obtaining opaque or bright products of fibers or other shaped articles.

However, in the case of the precipitated flakes of Run 2 which was carried out according to the treatment of this invention, no such turbidity occurs at all even though the flakes are washed with, say, water containing 80 p.p.m. of calcium ions.

Thus the treatment according to this invention has the advantage in this respect also in that costly soft water such as ion exchange water is not required.

EXAMPLE 2

Linter pulp was acetylated by the customary methylene chloride method, following which hydrolysis was carried out. When the acetic acid content of the cellulose acetate become 61%, the sulfuric acid, which was used as catalyst, was neutralized with an aqueous acetic acid solution of sodium acetate. To 1000 parts of a cellulose acetate solution consisting of 150 parts of the cellulose triacetate obtained as hereinabove described, 50 parts of methylene dichloride, 750 parts of acetic acid, 30 parts of water and the remainder of sodium sulfate and sodium acetate was added on oxidant indicated in Table III, following which the solution was stirred and mixed for one hour at 50° C. This was followed by the addition of a reducing agent indicated in Table III and stirring and mixing of the solution for a further one hour at 50° C. The cellulose acetate solution, after completion of the foregoing treatment, was then added to 8000 parts to an aqueous 20% acetic acid solution to precipitate cellulose triacetate in flake form, which was then water-washed and dried. The results of quality measurements of the flakes are shown in Table III. Runs 6, 7, 8 and 10 are experiments carried out in accordance with the invention process, while Run 9 is a blank test.

TABLE III

| | Conditions of experiment | | | | Quality of flakes | |
|---|---|---|---|---|---|---|
| Run | Class of oxidant | Amount added of oxidant part | Class of reducing agent | Amount added of reducing agent part | APHA color degree [1] | Degree of polymerization [2] |
| 6 | Dicumyl peroxide | 0.60 | $Na_3PO_3$ | 0.90 | 10 | 255 |
| 7 | Peracetic acid | 0.015 | $H_3PO_3$ | 0.05 | 40 | 257 |
| 8 | $KMnO_4$ | 0.015 | $Na_2SO_3$ | 0.30 | 5 | 254 |
| 9 | | 0 | | 0 | 50 | 257 |
| 10 | Peracetic acid | 0.005 | $H_3PO_3$ | 0.05 | 40 | 257 |

[1] APHA color degree of the flakes was measured as described in Example 1.
[2] Degree of polymerization of the flakes was obtained by obtaining the intrinsic viscosity [η] by means of the Oswald viscosity tube using metacresol as the solvent and then substitution in the following expression:

$$\text{Degree of polymerization} = \frac{[\eta]}{6.3} \times 10^4$$

Linter pulp is generally of better quality than wood pulp.

From the experimental results of this example in which linter pulp was used, it is seen that the effects of the invention process can be expected when the amount used of the oxidant is at least 0.005% by weight based on the cellulose acetate.

EXAMPLE 3

Pulp for producing polynosic was acetylated in customary manner, after which it was hydrolyzed. When the acetic acid content of the cellulose acetate became 55.3% an aqueous acetic acid solution of sodium acetate was added to neutralize the sulfuric acid used as catalyst. To 1000 parts of a cellulose acetate solution consisting of 100 parts of the cellulose acetate obtained as hereinabove described, 70 parts of water, 800 parts of acetic acid and the remainder of sodium sulfate and sodium acetate was added an oxidant indicated in Table IV followed by stirring and mixing the solution for 30 minutes at 40° C., after which a reducing agent indicated in the table was added and the solution was stirred and mixed for a further 30 minutes at 40%. This was followed by introducing the so treated cellulose acetate solution into water to precipitate cellulose diacetate as flakes, which was washed with water and dried, thereby obtained the cellulose diacetate product. Runs 11–13 are experiments conducted according to the invention process, while Run 14 is a blank test and Run 15 is that outside the scope of this invention.

TABLE IV

| | Conditions of experiment | | | | Quality of flakes | | |
|---|---|---|---|---|---|---|---|
| Run | Class of oxidant | Amount added of oxidant part | Class of reducing agent | Amount added of reducing agent part | APHA color degree | Heat resistance | Degree of polymerization |
| 11 | $KMnO_4$ | 3.0 | $(COOH)_2 \cdot 2H_2O$ | 1.0 | 20 | 7.5 | 153 |
| 12 | Peracetic acid | 3.0 | $H_3PO_3$ | 2.0 | 35 | 8.0 | 151 |
| 13 | do | 5.0 | do | 2.0 | 10 | 8.0 | 150 |
| 14 | | 0 | | 0 | 200 | 10.0 | 156 |
| 15 | Peracetic acid | 7.0 | $H_3PO_3$ | 2.0 | 10 | 8.0 | 147 |

NOTE.—The APHA color degree and heat resistance were measured as described in Example 1. The degree of polymerization was obtained by obtaining the intrinsic viscosity [η] by means of the Oswald tube using acetone as the solvent and substitution in the following expression:

$$\text{Degree of polymerization} = \frac{[\eta]}{9.0} \times 10^4$$

Heretofore, the pulp for producing polynosic was considered as not being suited for the production of cellulose acetate. One of the reasons was that the coloration of the cellulose acetate obtained therefrom was excessive. Even in a case such as this, good results as shown by Run 13 are readily obtained by the addition of a oxidative treating agent in an amount on the order of 5% by weight based on the cellulose acetate. Even though the amount added of the oxidative treating agent in increased to 7% as in Run 15, improvements in the color degree and heat resistance commensurate with such an increase cannot be noted. On the other hand, the degree of polymerization only continues to decline. Hence, an increase in the addition beyond 5% by weight is not desirable.

EXAMPLE 4

"Placetate" pulp was acetylated by the customary methylene chloride method, after which it was hydrolyzed. When the acetic acid content of the cellulose acetate became 55.5%, an aqueous acetic acid solution of sodium acetate was added to neutralize the sulfuric acid used as catalyst. To 1000 parts of a cellulose acetate solution consisting of 200 parts of the cellulose diacetate obtained as described above, 40 parts of water, 730 parts of acetic acid, 10 parts of methylene dichloride, 15 parts of sodium sulfate and 5 parts of sodium acetate were added 8 parts of an aqueous 5% potassium permanganate solution followed by stirring and mixing the solution for 30 minutes at 60° C., after which 5 parts of an aqueous 10% phosphorous acid solution were added to the solution which was stirred and mixed for a further 30 minutes at 60° C. This was followed by the addition of water to precipitate as flakes cellulose diacetate, which was water-washed and dried to yield the cellulose diacetate product.

The quality measurements of these flakes are shown in Table V under Run 16. A blank test Run 17 was conducted concurrently with the foregoing run under identical conditions except that the oxidation and reduction treatments were not given. The quality measurements of the resulting cellulose diacetate are shown under Run 17 in Table V. In order to compare the cellulose acetate obtained in Run 17, the blank test, with that obtained in Run 16, which is in accordance with the invention process, the cellulose acetate flakes of the former were submitted to a bleaching treatment in their solid state. The conditions of the bleaching treatment were so adjusted that the product would have the same APHA color degree as that of the product obtained in Run 16. Namely, 800 parts of an aqueous 5% acetic acid solution were added to 100 parts of the cellulose acetate flakes obtained in the blank test, after which the solution was heated at 100° C. Sixteen parts of an aqueous 5% potassium permanganate solution was then added and the oxidation treatment was carried out for 90 minutes at 100° C. This was followed by a reducing treatment which was carried out for 90 minutes at 100° C., after adding 100 parts of an aqueous 10% phosphorous acid solution. After the treatment, the flakes were washed with water and dried. The quality measurements of the so-obtained flakes are shown under Run 18 in Table V.

TABLE V

| Run | Quality of flakes | | | |
|---|---|---|---|---|
| | APHA Color degree | Acetic acid value, percent | Viscosity of 20% acetic solution, sec. | Degree of polymerization |
| 16 | 10 | 55.4 | 42 | 174 |
| 17 | 50 | 55.4 | 42 | 175 |
| 18 | 10 | 55.2 | 48 | 169 |

As can be appreciated from these experiments, in the case of the method wherein the resulting cellulose acetate is treated after it has been precipitated and transformed into a solid, treatment conditions which are much more harsh than those of the invention process must be employed for obtaining an equal degree of bleach. Hence, this also results in lowering the degree of polymerization of the product. Furthermore, despite the decline in the degree of polymerization, the solution viscosity rises. This is believed to be due to a false viscosity owing to a local degeneration of the cellulose acetate which has been subjected to the bleaching treatment in its solid form. From the fact that a phenomenon such as this is demonstrated, it is obvious that adverse effects will be had especially on the spinnability of filaments when a spinning solution prepared by dissolving these flakes are spun. Hence, cellulose acetate treated in this manner are not desirable. The viscosity indicated in the foregoing table was determined in accordance with the ASTM–E method.

EXAMPLE 5

Experiments in accordance with the invention process (Runs 19 and 20) and comparative experiments in which the solid flakes were treated (Runs 21 and 22), as well as a blank test (Run 23) were carried as in Example 4, except that as the oxidative treating agent sodium chlorite and as the reducing treating agent phosphorous acid were used. The reason that the foregoing chemicals were used as the treating agent was that I confirmed that the fact that these had the least adverse effects on the product when cellulose acetate was treated in its solid flake form. Hence, this example was conducted for proving that the invention process was far superior even when treating agents which are most suitable for treating solid flakes are used.

The acetylation of the pulp was carried out exactly as described in Example 1. The amounts used of the treating agents were as indicated in Table VI. The oxidative and reducing treatments were respectively carried out for 20 minutes at 60° C. in Runs 19 and 20 (invention process). In Runs 21 and 22 (flake treatment method), flakes amounting to 20% by weight were dispersed in water, following which the oxidative and reducing treatments were respectively carried out for 90 minutes at 60° C. The quality measurments of the products so obtained are shown in Table VI.

TABLE VI

| | Conditions | | Quality of flakes | |
|---|---|---|---|---|
| Run | Amount used of $NaClO_2$ based on flakes, wt. percent | Amount used of $H_3PO_3$ based on flakes, wt. percent | APHA color degree | Degree of polymerization |
| 19 | 0.1 | 0.05 | 30 | 174 |
| 20 | 0.2 | 0.1 | 20 | 172 |
| 21 | 0.2 | 0.1 | 65 | 172 |
| 22 | 0.8 | 0.4 | 25 | 169 |
| 23 | 0 | 0 | 90 | 175 |

As can be appreciated from these results, even though treating agents which are favorable for the solids bleaching method are used, far milder conditions can be employed in the case of the invention process for obtaining products having the same color degree. Hence, neither a decline in the degree of polymerization nor local degeneration occurs.

I claim:

1. A process for producing bleached and purified cellulose acetate, which comprises effecting in the course of the production of cellulose acetate, an oxidative treatment followed by a reducing treatment during the stage in which the cellulose acetate is in a solution state prior to its precipitation, said oxidative and reducing treatments being effected by the addition to said solution, based on the cellulose acetate, of respectively 0.005–5% by weight of an oxidant selected from the group consisting of alkali metal permanganates, alkali metal chromates, hydrogen perixode, organic peroxides, and chlorites, and 0.001–10% by weight of a reducing agent selected from the group consisting of oxalic acid, formic acid, phosphorous acid, sulfurous acid, and alkali metal salts thereof.

2. The process according to claim 1 wherein the amount of said oxidant is 0.05–1% by weight and that of said reducing agent is 0.01–3% by weight.

3. The process according to claim 1 wherein said oxidative treatment is effected for 10–120 minutes at 20–70° C.

4. The process according to claim 1 wherein said reducing treatment is effected for 60–120 minutes at 20–70° C.

5. The process according to claim 1 wherein said oxidant is an alkali metal permanganate.

6. The process according to claim 1 wherein said reducing agent is oxalic acid.

7. A process for producing bleached and purified cellulose acetate which comprises effecting in the course of the production of cellulose acetate, an oxidative treatment followed by a reducing treatment during the stage in which the cellulose acetate is in a solution state following the neutralization of the strong acid used as catalyst and prior to precipitation of the cellulose acetate, said oxidative and reducing treatments being effected by the addition to said solution, based on the cellulose acetate, of respectively 0.005–5% by weight of a oxidant selected from the group consisting of alkali metal permanganates, alkali metal chromates, hydrogen peroxide, organic peroxides, and chlorites, and 0.001–10% by weight of a reducing agent selected from the group consisting of oxalic acid, formic acid, phosphorous acid, sulfurous acid, and alkali metal salts thereof.

8. The process according to claim 7 wherein the amount of said oxidant is 0.05–1% by weight and that of said reducing agent is 0.01–3% by weight.

9. The process according to claim 7 wherein said oxidative treatment is effected for 10–120 minutes at 20–70° C.

10. The process according to claim 7 wherein said reducing treatment is effected for 60–120 minutes at 20–70° C.

11. The process according to claim 7 wherein said oxidant is an alkali metal permanganate.

12. The process according to claim 7 wherein said reducing agent is oxalic acid.

References Cited
UNITED STATES PATENTS

| | | | |
|---|---|---|---|
| 2,684,360 | 7/1954 | Davoud | 260—230 |
| 2,337,880 | 12/1943 | Fordyce et al. | 260—230 |

DONALD E. CZAJA, Primary Examiner

R. W. GRIFFIN, Assistant Examiner

U.S. Cl. X.R.

106—190, 196, 198